(No Model.) 2 Sheets—Sheet 1.
W. HOLLIDAY.
BAND CUTTER AND FEEDER.
No. 430,954. Patented June 24, 1890.
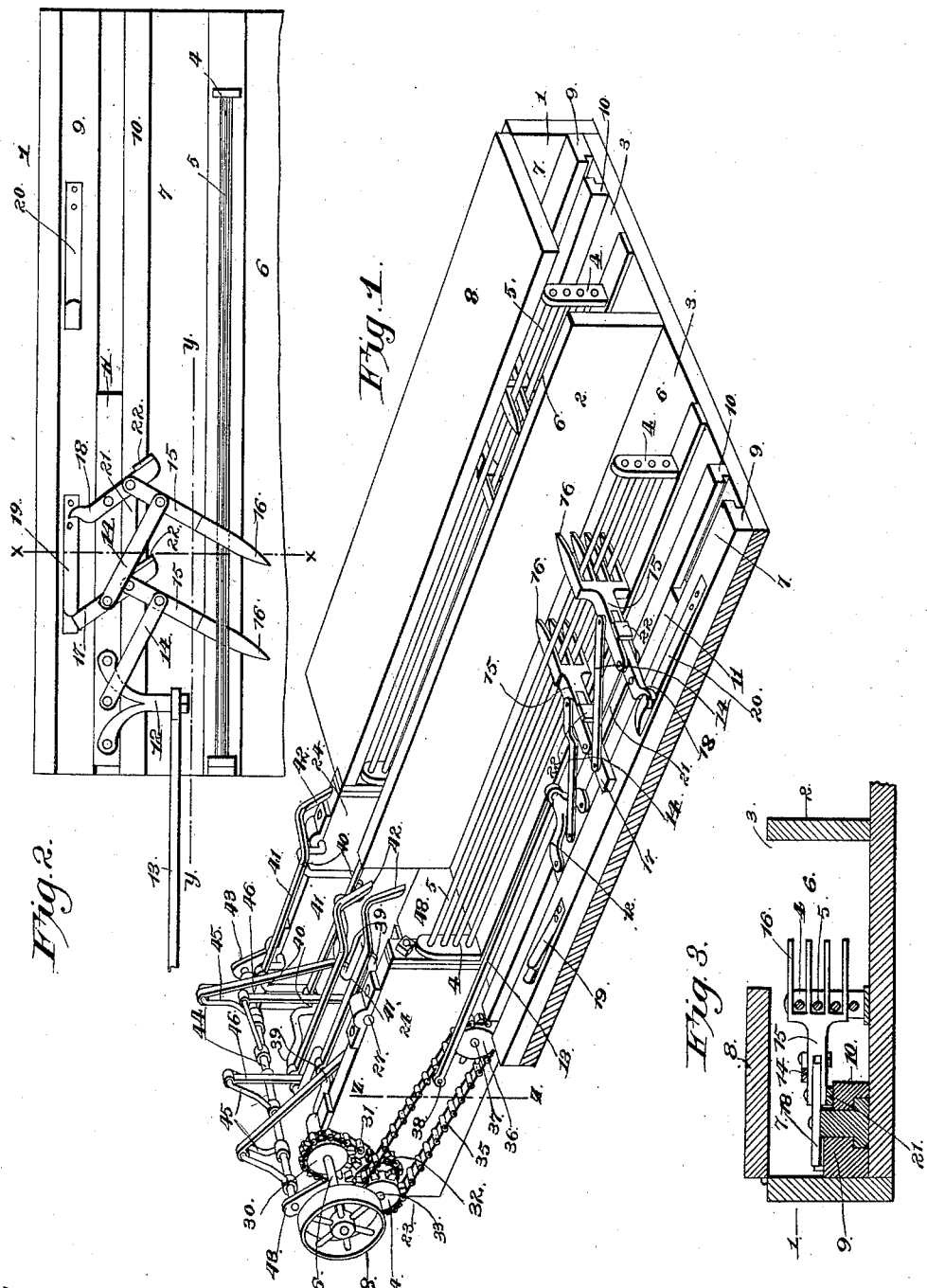
Witnesses
M. Fowler
Wm. Bagger
By his Attorneys,
Inventor
William Holliday
C. A. Snow & Co.

(No Model.) 2 Sheets—Sheet 2.

W. HOLLIDAY.
BAND CUTTER AND FEEDER.

No. 430,954. Patented June 24, 1890.

Witnesses
M. Fowler
Wm. Bagger.

Inventor
William Holliday
By his Attorneys
C. A. Snow & Co.

UNITED STATES PATENT OFFICE.

WILLIAM HOLLIDAY, OF SANBORN, NORTH DAKOTA.

BAND-CUTTER AND FEEDER.

SPECIFICATION forming part of Letters Patent No. 430,954, dated June 24, 1890.

Application filed January 10, 1890. Serial No. 336,484. (No model.)

*To all whom it may concern:*

Be it known that I, WILLIAM HOLLIDAY, a citizen of the United States, residing at Sanborn, in the county of Barnes and State of North Dakota, have invented new and useful Band-Cutters and Feeders, of which the following is a specification.

This invention relates to band-cutters and feeders for thrashing-machines; and it has for its object to construct a device of this class which shall be simple, durable, and efficient in operation, and which may be readily attached to any thrashing-machine of ordinary construction.

My invention consists in the improved construction, arrangement, and combination of parts, which shall be hereinafter fully described, and particularly pointed out in the claims.

Figure 4:
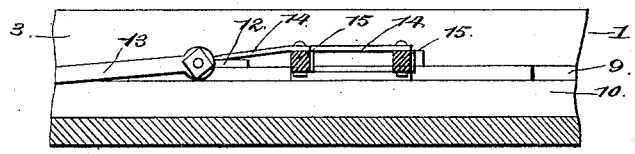
Figure 5:
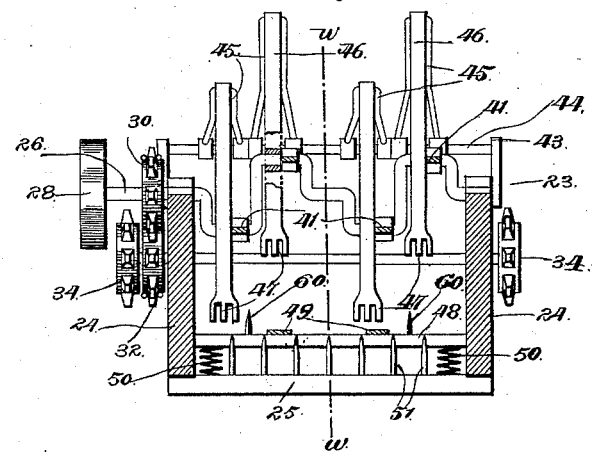
Figure 6:
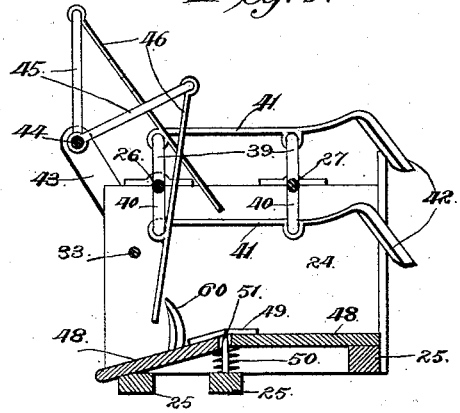

In the drawings hereto annexed, Figure 1 is a perspective view of my improved band-cutter and feeder, part being broken away. Fig. 2 is a plan view, on a larger scale, of a portion of the feeding mechanism, the cover of the box or casing in which it is contained having been removed. Fig. 3 is a transverse sectional view taken on the line $x\ x$ in Fig. 2. Fig. 4 is a sectional view taken on the line $y\ y$ of Fig. 2. Fig. 5 is a sectional view taken on the line $z\ z$ in Fig. 1. Fig. 6 is a sectional view taken on the line $w\ w$ in Fig. 5.

Like numerals of reference indicate like parts in all the figures.

1 designates a trough or casing, which is provided with a central longitudinal partition 2, whereby it is divided into two compartments 3 3 of equal size. Suitably secured in the ends of the said compartments and about centrally of the width of the same are uprights or brackets 4 4, which are connected by longitudinal rods or wires 5 5, forming what may be described as "fences," whereby each of the compartments 3 is divided longitudinally into sub-compartments 6 and 7. The inner compartments 6 form the grain-channels, and the outer compartments 7 contain the operating mechanism by means of which the grain is fed, as will be hereinafter described. The outer compartments 7 are provided with covers 8, which are normally closed, so as to protect the operating mechanism. Each of the compartments 7 is provided with longitudinal guide-cleats 9 and 10, between which are arranged the longitudinally-movable slides 11. Each of said slides is provided at its rear with a bracket 12, which is connected by a pitman 13 with operating mechanism, which will be hereinafter more fully described. Said slides are also provided with pivoted arms or braces 14 14, to which are pivotally connected the shanks 15, carrying rakes 16, the tines of which extend horizontally between the horizontal wires 5, forming the fences. The outer ends of the shanks 15 are connected pivotally with the free ends of latch-arms 17 and 18, which are connected pivotally to the slides 11, and the projecting ends of said latch-arms are suitably shaped to engage spring-catches 19 and 20, which are mounted upon the upper sides of the outer guide-cleats 10. Pivoted links 21 connect the inner ends of the latch-arms 17 and 18, and the latter are provided with lugs 22 to abut against the shanks 15 of the rakes to prevent the latter from swinging in a forward direction.

The operation of this part of my invention is as follows: The bundles of grain are pitched into the compartments 6 between the central partition 2 and the longitudinal fences 5. When a reciprocating motion in a forward direction is imparted to the slides 11 the latch-arms 17 will first come in contact with the catches 19, and the outer ends of the latch-arms will thus be thrown in a rearward direction, thereby manipulating the shanks 15 of the rake-heads in such a manner as to throw the said rake-heads outwardly and rearwardly between the strands or wires 5, in which position the slides carrying the rake-heads may readily pass in a forward direction past the bundles of grain contained in the trough or casing. When the movement of the slides is reversed, the latch-arms 18 come in contact with the catches 20, thus throwing the rake-heads forwardly and inwardly, causing the rakes to engage the bundles of grain and carry them in a rearward direction toward the band-cutting mechanism, which will be presently more fully described. It will be observed that in this manner the bundles of grain will be fed through the trough 1.

Suitably connected to the rear end of the trough or casing 1 or to the rear uprights or brackets 4 in the latter is a frame 23, consisting of side pieces 24, suitably connected by means of transverse braces 25. Journaled transversely in the sides of the said frame are two crank-shafts 26 27, the rear one of which 26 is extended beyond one of the side pieces 24 and provided with a band-wheel or pulley 28, which may be connected by means of a belt or band with a drum upon the cylinder-shaft of the thrashing-machine to which the device is attached for operation. The shaft 26 is also provided with a sprocket-wheel 30, which is connected by means of a chain 31 with a sprocket-wheel 32, mounted upon a transverse shaft 33. The latter is provided at each of its ends with additional sprocket-wheels 34, which are connected by means of chains 35 with sprocket-wheels 36, mounted upon the stub axles or spindles 37 near the front ends of the sides 24 of the frame 23. One link of each of the chains 35 is provided with a laterally-extending pin 38, which is connected pivotally with the rear end of one of the pitmen 13, to which motion will thus be transmitted.

It will be observed that by the mechanism described a sufficient length of movement will be imparted to the pitman 13, and slides 11 operated thereby, without necessity for employing crank-wheels of great diameter.

Each of the crank-shafts 26 and 27 is provided with a number of cranks or wrists 39 40, and the corresponding wrists of each shaft are connected by the pivoted arms 41, the front ends of which are bent downwardly to form the sharp edges, knives, or cutters 42. It will be seen that when a rotary movement is imparted to the shaft 26 the said knives or cutters will receive a vibratory movement, serving to sever the bands of such bundles of grain as may be placed beneath them at the time.

Brackets 43, extending diagonally in a rearward direction from the sides of the frame 23, afford bearings for a transverse shaft 44, upon which a series of arms 45 are pivotally mounted. The outer ends of said arms are connected pivotally with the feeding-rods 46, which are in turn connected pivotally with the cranks or wrists 39 of the rear crank-shaft 26. The knives 42 will cut the bands of the bundles underneath by the downward movement, which is imparted to them by the cranks or wrists upon the shafts 26 and 27, with which the arms or handles 41 of said knives are connected. As soon as the band has been severed the lower end of the feeding-rod 46 assumes its rearward movement, feeding the loose grain to the cylinder of the thrashing-machine. It is obvious that the lower ends of the feeding-rod 46 will be provided with forks 47 of suitable construction, in order that the loose grain may be fed with accuracy and certainty to the cylinder of the thrashing-machine.

Mounted pivotally between the sides of the frame 23, near the front and rear ends of the latter, are a pair of bottom boards 48, the inner ends of which are flexibly connected by means of straps 49, and the said inner ends of which are forced in an upward direction by means of springs 50, interposed between the inner ends of the said bottom boards and the central transverse brace 25. The latter is provided with prongs 51, extending upwardly between the inner or meeting ends of the bottom boards 28, but the latter are normally raised by the action of the springs 50 above the upper ends of the said prongs. It will be seen that when the bundles of grain are depressed by the action of the feeding-rods 46 the bottom boards 48 will yield under the pressure, and the prongs 51 will project into the bundles, thereby assisting in holding the latter securely while being subjected to the action of the band-cutting knives.

The operation of my invention and its advantages will be readily understood from the foregoing description when taken in connection with the drawings hereto annexed. The carrying-forks 16, operated by the reciprocating slides 11, will serve to convey the bundles of grain to the band-cutting mechanism, where the bundles are held securely in the manner described, while being subjected to the action of the band-cutting knives. It may be stated that the rear carrying-rakes 16 have fewer tines than the front ones, in order to prevent accident to the machinery by the said rakes moving into the paths of the band-cutting knives. The bands of the bundles having been severed, the loose grain will be fed evenly and positively to the cylinder of the thrashing-machine.

A pair of supplementary knives or cutters 60 extend upwardly from one of the bottom boards 48 for the purpose of severing the bands of any bundles that might possibly escape the action of the knives 42.

I desire it to be understood that I reserve to myself the right to any modifications in the details of the construction of my improved feeder and band-cutter which may be resorted to without departing from the spirit of my invention.

Having thus described my invention, what I claim is—

1. The combination of a trough or casing, uprights near the ends of the same, horizontal strands or wires connecting the said uprights, a longitudinally-reciprocating slide, means for operating said slide, and rakes mounted pivotally upon the latter, the tines of said rakes being extended between the strands or wires and adapted to convey bundles of grain longitudinally through the casing, substantially as set forth.

2. The combination of a trough or casing, a longitudinally-reciprocating slide, means for operating the latter, the rakes connected pivotally with said slide, the longitudinal strands of wire forming guards between which the teeth of the rakes project, and mechanism for vibrating the said rakes at the ends of the movement of said slide, substantially as set forth.

3. The combination of a trough or casing, the uprights at the front and rear of the same, the horizontal strands or wires connecting said uprights, the longitudinally-reciprocating slides, means for operating said slides, the rakes connected pivotally with the latter, the tines of said rakes being extended between said strands or wires, and mechanism for vibrating said rakes at the ends of the movement of said slide, substantially as and for the purpose set forth.

4. The combination, with the trough or casing, the longitudinally-reciprocating slides having inwardly-extending brackets, means for operating said slides, the shanks pivoted to said brackets and having rake-heads at their inner ends, the latch-arms connected pivotally with the outer ends of said shanks and with the slides, the links connecting said latch-arms, and the beveled catches arranged to engage the said latch-arms, substantially as and for the purpose set forth.

5. The combination of the trough or casing having the central longitudinal partition, the fences arranged longitudinally in the compartments thus formed, the longitudinally-reciprocating slides arranged in the outer sub-compartments, means for operating said slides, the rakes connected pivotally with the said slides and having tines extending between the strands of the fences, and mechanism, substantially as described, for vibrating said rakes at the ends of the movement of the carrying-slides, substantially as set forth.

6. The combination, with the longitudinally-reciprocating slides having inwardly-extending brackets, and means for operating said slides, of the shanks pivoted to said brackets and having the rake-heads, the latch-arms connected pivotally with the slides and with the outer ends of the shanks and provided with upwardly-extending lugs to engage the said shanks, and the links connecting the said latch-arms, substantially as and for the purpose set forth.

7. The combination, with the longitudinally-reciprocating slides carrying the grain-feeding devices and having laterally-extending brackets, of the pitmen connecting said brackets, with pins extending laterally from the links of endless chains, and suitable operating mechanism, substantially as and for the purpose set forth.

8. The combination of a pair of crank-shafts, arms pivotally connecting the corresponding wrists or cranks of said shafts and having downwardly-extending band-cutting knives, a transverse shaft having pivoted arms, the feeding-rods connected pivotally with said arms and with the cranks or wrists of the rear crank-shaft, and suitable operating mechanism, substantially as set forth.

9. In a band-cutting device, the combination, with the band-cutting knives, of a yielding floor adapted to support the bundles of grain while being subjected to the action of the band-cutters, said floor being composed of pivoted sections having their meeting ends flexibly connected and supported by means of springs, substantially as set forth.

10. The combination of the frame, the yielding floor composed of pivoted sections having their meeting ends flexibly connected, a transverse brace having prongs extending upwardly between the meeting ends of said pivoted floor-sections, springs interposed between the said brace and the meeting ends of the floor-sections, the band-cutting knives, and mechanism for forcing the bundles of grain downwardly upon the yielding floor-sections while being subjected to the action of the band-cutting knives, substantially as and for the purpose set forth.

11. The combination of the frame having the yielding floor-sections flexibly connected at their meeting ends, the transverse brace having upwardly-extending prongs, the springs interposed between the said brace and the meeting ends of the pivoted floor-sections, the crank-shafts, the arms pivotally connecting corresponding cranks or wrists of the latter, and having downwardly-extending band-cutting knives, a transverse shaft, arms mounted pivotally upon the latter, and feeding-rods connected pivotally with said arms and with the cranks of the rear crank-shaft, substantially as and for the purpose set forth.

In testimony that I claim the foregoing as my own I have hereto affixed my signature in presence of two witnesses.

WILLIAM HOLLIDAY.

Witnesses:
  S. E. THOMPSON,
  VERNON J. Y. SHAW.